United States Patent
Hatanaka et al.

(10) Patent No.: US 9,909,852 B2
(45) Date of Patent: Mar. 6, 2018

(54) OPERATION POSITION DETECTION APPARATUS AND VEHICULAR APPARATUS

(71) Applicants: DENSO CORPORATION, Kariya, Aichi-pref. (JP); NIPPON SOKEN, INC., Nishio, Aichi-pref. (JP)

(72) Inventors: Shinji Hatanaka, Okazaki (JP); Norio Sanma, Okazaki (JP); Toru Nada, Inazawa (JP); Kiyotaka Taguchi, Kariya (JP); Makoto Manabe, Chiryu (JP); Akira Yoshizawa, Koganei (JP); Makoto Obayashi, Kashiwa (JP)

(73) Assignees: DENSO CORPORATION, Kariya, Aichi-pref. (JP); SOKEN, INC., Nishio, Aichi-pref. (JP)

( * ) Notice: Subject to any disclaimer, the term of this patent is extended or adjusted under 35 U.S.C. 154(b) by 860 days.

(21) Appl. No.: 14/381,404

(22) PCT Filed: Feb. 14, 2013

(86) PCT No.: PCT/JP2013/000791
§ 371 (c)(1),
(2) Date: Aug. 27, 2014

(87) PCT Pub. No.: WO2013/128819
PCT Pub. Date: Sep. 6, 2013

(65) Prior Publication Data
US 2015/0106051 A1    Apr. 16, 2015

(30) Foreign Application Priority Data
Feb. 29, 2012 (JP) .................. 2012-044199

(51) Int. Cl.
*G01B 5/30* (2006.01)
*G06F 3/041* (2006.01)
*G06F 3/0354* (2013.01)

(52) U.S. Cl.
CPC ............. *G01B 5/30* (2013.01); *G06F 3/0354* (2013.01); *G06F 3/041* (2013.01); *G06F 3/0414* (2013.01)

(58) Field of Classification Search
CPC ...... G06F 3/0354; G06F 3/014; G06F 3/0414; G06F 3/041; G01B 5/30
See application file for complete search history.

(56) References Cited

U.S. PATENT DOCUMENTS

| 8,780,062 B2 * | 7/2014 | Hibara | G06F 3/0414 345/173 |
| 2003/0071784 A1 | 4/2003 | Sato et al. | |

(Continued)

FOREIGN PATENT DOCUMENTS

| CN | 2792878 Y | 7/2006 |
| CN | 102067070 A | 5/2011 |

(Continued)

OTHER PUBLICATIONS

International Search Report and Written Opinion (in Japanese with English Translation) for PCT/JP2013/000791, dated Apr. 16, 2013; ISA/JP.

*Primary Examiner* — Nguyen Ha
(74) *Attorney, Agent, or Firm* — Harness, Dickey & Pierce, P.L.C.

(57) ABSTRACT

An operation position detection apparatus includes: an operation body including front and back side operation surfaces; a casing; three strain generating bodies on at least one operation surface, wherein each strain generating body includes a connection section connected to the operation body, a fixed section fixed to the casing, and a displacement transmission surface displaceable by a pushing pressure to each operation surface; a distortion detection section arranged on each displacement transmission surface and detecting a distortion of the displacement transmission sur- (Continued)

face; and an operation position calculation section detecting which of the front side operation surface and the back side operation surface is pushed, the magnitude of the operation force generated by the pushing pressure, and an operation position of the pushing pressure, according to a detected distortion.

7 Claims, 15 Drawing Sheets

(56) References Cited

U.S. PATENT DOCUMENTS

| | | | |
|---|---|---|---|
| 2009/0046071 A1* | 2/2009 | Griffin | G06F 1/1626 345/173 |
| 2009/0065267 A1* | 3/2009 | Sato | G01L 1/20 178/18.06 |
| 2009/0315834 A1 | 12/2009 | Nurmi et al. | |
| 2010/0045624 A1 | 2/2010 | Hisatsugu et al. | |
| 2011/0074665 A1 | 3/2011 | Konishi | |
| 2012/0008266 A1* | 1/2012 | Nomura | G06F 3/044 361/679.01 |
| 2012/0055268 A1 | 3/2012 | Hatanaka et al. | |
| 2012/0128966 A1 | 5/2012 | Sanma et al. | |
| 2013/0088437 A1 | 4/2013 | Nishidate | |

FOREIGN PATENT DOCUMENTS

| | | | |
|---|---|---|---|
| JP | H05298013 A | 11/1993 | |
| JP | 2750472 B2 | 5/1998 | |
| JP | 2760473 B2 | 5/1998 | |
| JP | H10108851 A | 6/1998 | |
| JP | H11039093 A | 2/1999 | |
| JP | 2003091360 A | 3/2003 | |
| JP | 2008330616 A | 11/2003 | |
| JP | 2006120009 A | 6/2006 | |
| JP | 2006252093 A | 9/2006 | |
| JP | 2009129171 A | 5/2009 | |
| JP | 2009187290 A | 8/2009 | |
| JP | 2010018204 A | 1/2010 | |
| JP | 2010049460 A | 3/2010 | |
| JP | 2010086076 A | 4/2010 | |
| JP | 2011076440 A | 4/2011 | |
| JP | 4682357 B2 | 5/2011 | |
| JP | 2012003304 A | 1/2012 | |
| JP | 2012058967 A | 3/2012 | |
| JP | 2013182324 A * | 9/2013 | ........... G06F 3/0414 |

* cited by examiner

FIG. 12
| ELEMENT | CHANGE OF RESISTANCE |
|---------|---------------------|
| 4a | DECREASE |
| 4b | DECREASE |
| 4c | INCREASE |
| 4d | INCREASE |
FIG. 13
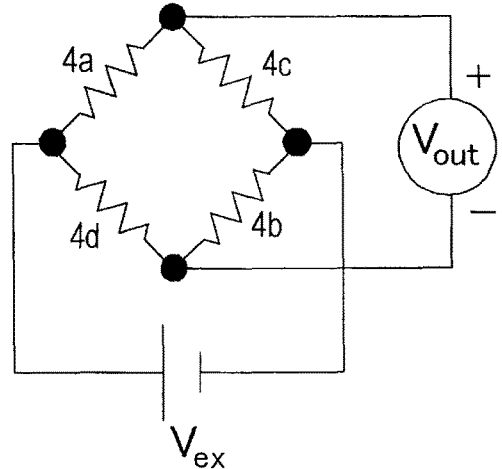
FIG. 14
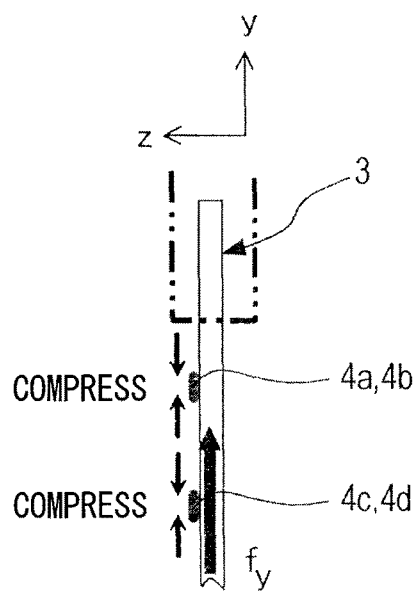

FIG. 15A
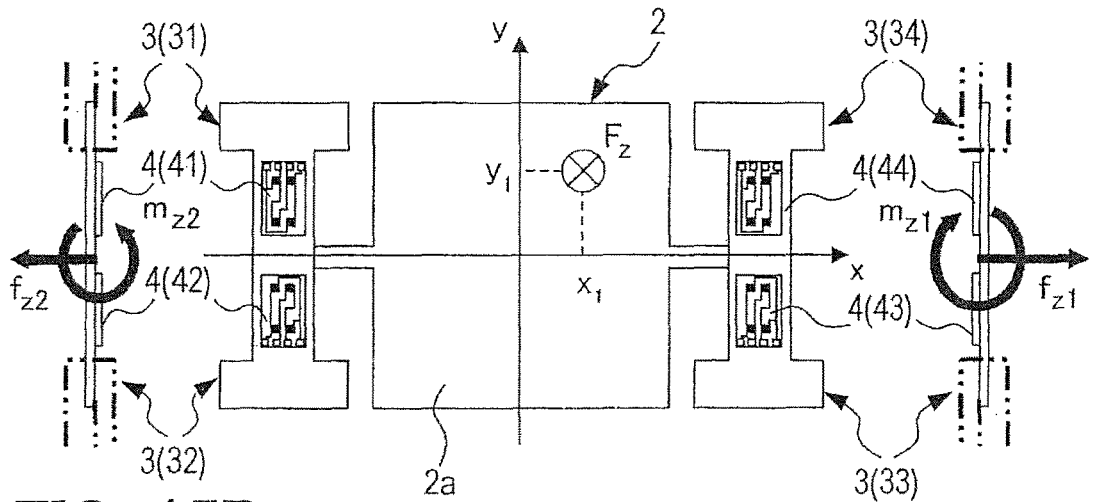
FIG. 15B
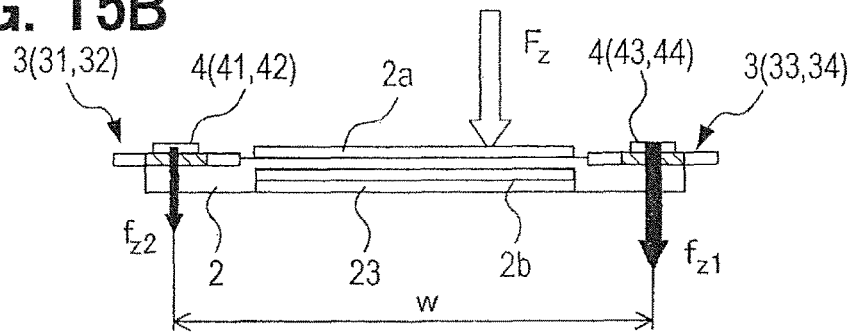
FIG. 15C
$$F_z = f_{z1} + f_{z2} \quad \cdots (1-1)$$
$$F_z \cdot \overline{x} = f_{z1} \cdot \frac{w}{2} - f_{z2} \cdot \frac{w}{2} \quad \cdots (1-2)$$
$$F_z \cdot \overline{y} = m_{z1} + m_{z2} \quad \cdots (1-3)$$
$$\overline{x} = \frac{f_{z1} \cdot \frac{w}{2} - f_{z2} \cdot \frac{w}{2}}{f_{z1} + f_{z2}} \quad \cdots (1-4)$$
$$\overline{y} = \frac{m_{z1} + m_{z2}}{f_{z1} + f_{z2}} \quad \cdots (1-5)$$

$$F_z \cdot \cos\theta = f_{z1} + f_{z2} + f_{z3} + f_{z4} \qquad \cdots(2\text{-}1)$$

$$F_z \cdot \cos\theta \cdot \bar{x} + F_z \cdot \sin\theta \cdot h = (f_{z1} + f_{z4}) \cdot \frac{w}{2} - (f_{z2} + f_{z3}) \cdot \frac{w}{2} \qquad \cdots(2\text{-}2)$$

$$\bar{x} + \tan\theta \cdot h = \frac{\{(f_{z1} + f_{z4}) - (f_{z2} + f_{z3})\} \cdot \dfrac{w}{2}}{f_{z1} + f_{z2} + f_{z3} + f_{z4}} \qquad \cdots(2\text{-}3)$$

OPERATION POSITION DETECTION APPARATUS AND VEHICULAR APPARATUS

CROSS REFERENCE TO RELATED APPLICATIONS

This application is a U.S. National Phase Application under 35 U.S.C. 371 of International Application No. PCT/JP2013/000791 filed on Feb. 14, 2013 and published in Japanese as WO 2013/128819 A1 on Sep. 6, 2013. This application is based on Japanese Patent Application No. 2012-044199 filed on Feb. 29, 2012. The entire disclosures of all of the above applications are incorporated herein by reference.

TECHNICAL FIELD

The present disclosure relates to a load detection type operation position detection apparatus and a vehicular apparatus.

BACKGROUND

Conventionally, a load detection type operation position detection apparatus, which includes an operation body having a plate shape and an operation surface for receiving pushing pressure formed thereon, and a strain detection element for detecting a strain caused by the pushing pressure on the operation surface, is well known (in, for example, patent document No. 1). Such an operation position detection apparatus can detect an operation position on the operation surface applied the pushing pressure and a magnitude of the operation force applied to the operation surface according to the strain detected by the strain detection element. Thus, the apparatus can receives various operations via the operation surface.

However, a conventional load detection type operation position detection apparatus can receive only the pushing pressure via the operation surface, which is formed on one side of the operation body having the plate shape. Thus, options of operation for being received via the operation body are limited.

PRIOR ART LITERATURES

Patent Literature

Patent Literature 1
JP-A-2010-49460

SUMMARY OF INVENTION

It is an object of the present disclosure to provide an operation position detection apparatus and a vehicular apparatus, which are capable of receiving various options of operation via an operation body having a plate shape.

According to a first aspect of the present disclosure, an operation position detection apparatus includes: an operation body including a front side operation surface and a back side operation surface and having a substantially plate shape; a casing accommodating the operation body; at least three or more strain generating bodies arranged on at least one of the front side operation surface and the back side operation surface, wherein each strain generating body includes a connection section for connecting to the operation body, a fixed section fixed to the casing, and a displacement transmission surface displaceable according to an operation force, which is generated by a pushing pressure to each of the front side operation surface and the back side operation surface, and wherein the connection section is arranged on one end of the strain generating body, the fixed section is arranged on the other end of the strain generating body, and the displacement transmission surface is arranged between the connection section and the fixed section; a distortion detection section arranged on the displacement transmission surface of each strain generating body and detecting a distortion of the displacement transmission surface caused by a displacement of the strain generating body; and an operation position calculation section detecting which of the front side operation surface and the back side operation surface is pushed, the magnitude of the operation force generated by the pushing pressure, and an operation position as a position at which the pushing pressure is applied, according to the distortion detected by each distortion detection section.

In the above operation position detection apparatus, the pushing pressure is accepted by each of the front side operation surface and the back side operation surface, which are arranged on the operation body, so that the operation force and the operation position are detected. Thus, the apparatus can receive various options of operation via the operation body having the plate shape.

According to a second aspect of the present disclosure, a vehicular apparatus includes: the operation position detection apparatus according to the first aspect of the present disclosure and attached to a steering device of a vehicle in such a manner that the front side operation surface faces a driver, who is driving the vehicle; and a control device executing various processes based on the magnitude of the operation force or the operation position, which are calculated with respect to the pushing pressure to the front side operation surface or the back side operation surface.

In the above vehicular apparatus, while a driver keeps gripping a steering device, the driver can operate the vehicular apparatus when the driver is driving the vehicle. Thus, convenience is improved. Further, since the operation position detection apparatus includes two operation surfaces of the front side operation surface and the back side operation surface, the driver can execute a variety of operations.

BRIEF DESCRIPTION OF DRAWINGS

The above and other objects, features and advantages of the present disclosure will become more apparent from the following detailed description made with reference to the accompanying drawings. In the drawings:

FIG. 12 is a diagram showing a change of a resistance of each strain detection element when the pushing operation force is applied to the front side operation surface in perpendicular to the front side operation surface;

FIG. 13 shows an equivalent circuit of the strain detection section;

FIG. 14 is a diagram explaining a stress applied to the displacement transmission surface of the strain generating body when the pushing operation force in an in-plane direction on the front side operation surface;

FIGS. 15A to 15C are diagrams explaining a calculation method of a center position of the operation force applied to the front side operation surface;

EMBODIMENTS FOR CARRYING OUT INVENTION

Embodiments of the present disclosure will be explained with reference to the drawings as follows. Here, embodiments of the present disclosure are not limited to the following embodiments, and the embodiments may be modified variously as long as the embodiments are disposed within a technical aspect of the present disclosure.

First Embodiment

Figure 1:
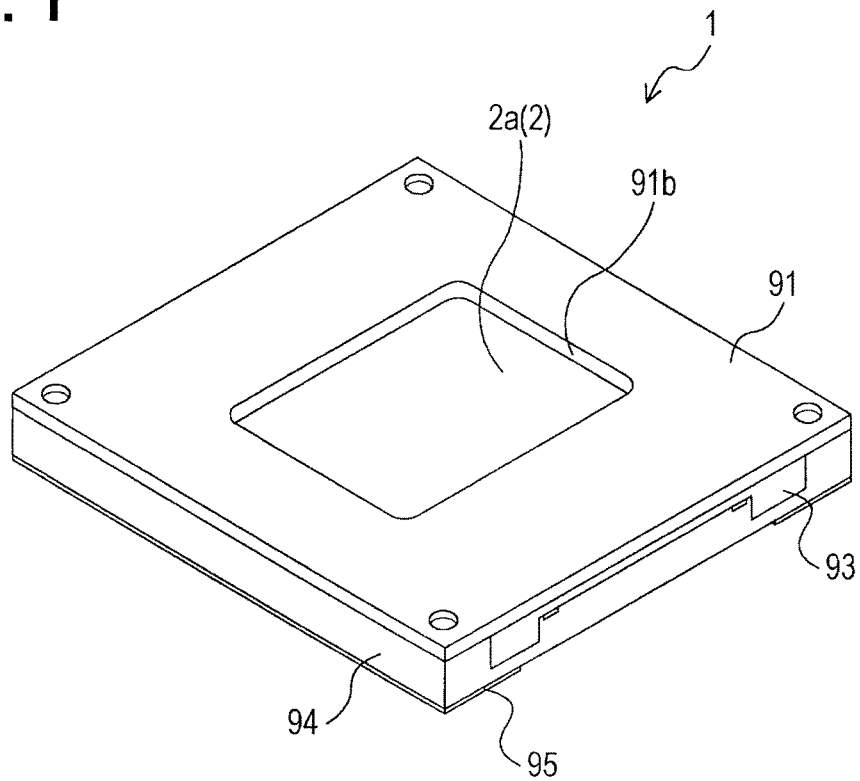
FIG. 1 is a perspective view of an operation position detection apparatus according to a first embodiment seeing from an upside.
Figure 2:
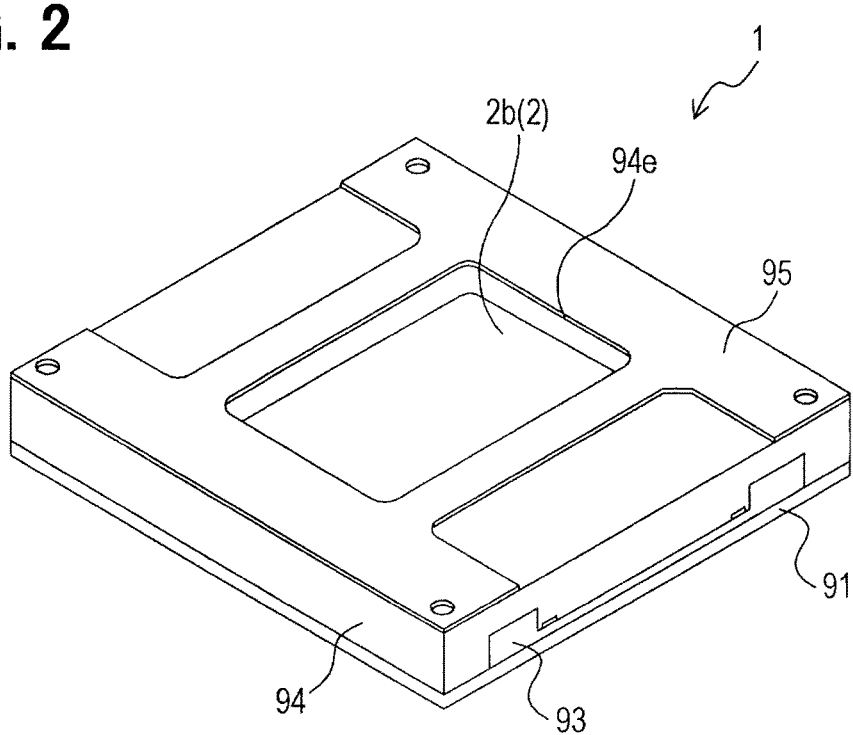
FIG. 2 is a perspective view of the operation position detection apparatus according to the first embodiment seeing from a down side.
Figure 3:
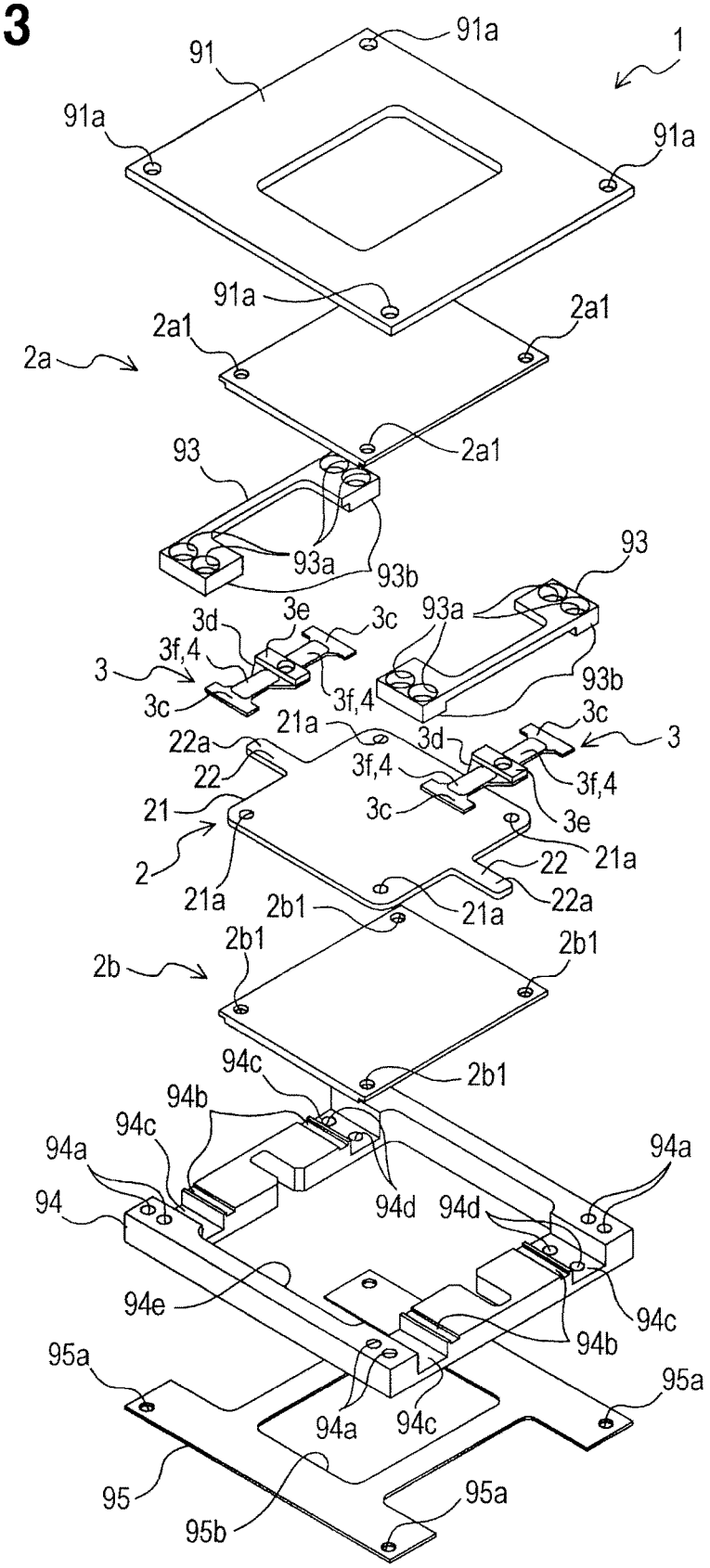
FIG. 3 is an exploded perspective view of the operation position detection apparatus according to the first embodiment.

As shown in FIGS. 1 to 3, an operation position detection apparatus 1 according to the first embodiment includes an upper cover 91, a holding member 93, a casing 94, a bottom cover 95, a front side operation surface 2a, an operation body 2 having a back side operation surface 2b and the like, and the like. The apparatus 1 receives an operation via each of the front side operation surface 2a and the back side operation surface 2b.

The upper cover 91 has a function for maintaining a strength of the operation position detection apparatus 1, preventing dust, and providing a design. The upper cover 91 is attached to the casing 94 (having a screw hole 94a) together with the bottom cover 95 (having a screw hole 95a) via a screw hole 91a. Further, the upper cover 91 has an opening 91b, and the front side operation surface 2a exposed from the opening 91b is operable for an user. The bottom of the casing 94, which is covered by the bottom cover 95, has an opening 94e. The back side operation surface 2b exposed from the opening 94e is operable for the user.

The front side operation surface 2a and the back side operation surface 2b provide a sheet member. The front side operation surface 2a and the back side operation surface 2b have a function for protecting the front side and the back side of the operation body 2 and a function for improving ornament of the operation position detection apparatus 1. Alternatively, the front side operation surface 2a and the back side operation surface 2b may be integrated with the operation body 2. The front side operation surface 2a and the back side operation surface 2b are attached to the front side and the back side of the operation body 2 (having a screw hole 21a) via, for example, screw holes 2a1, 2b1, respectively.

The operation body 2 includes an operation main body 21 having a rectangular shape and a plate shape, and multiple operation surface connectors 22 having a square pole shape, each of which protrudes from the operation main body 21 to an outside thereof. The operation body 2 includes one or more pairs of the operation surface connectors 22, which are arranged to face each other so that the connectors 22 sandwich the front side operation surface 2a and the back side operation surface 2b therebetween. In the first embodiment, two operation surface connectors 22 are formed to be symmetrical with respect to a straight line in a Y axis, which passes through a center position of the front side operation surface 2a having the square pole shape (please refer to FIG. 5). The shape of the operation main body 21 may be a rectangle or a square.

Figure 4:
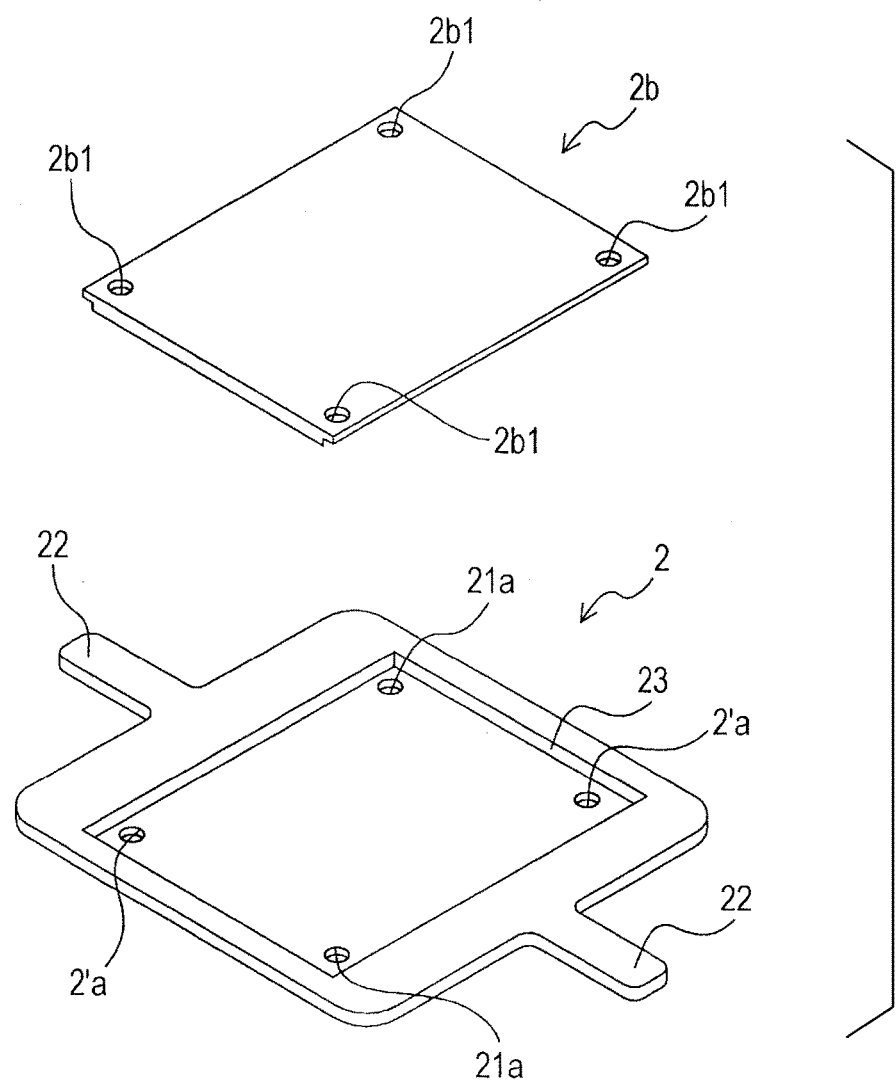
FIG. 4 is an exploded perspective view of the operation position detection apparatus according to the first embodiment seeing from a back side.

As shown in FIG. 4, a concavity surfaced 23 having a rectangular shape is formed on the back side of the operation body 2. The back side operation surface 2b is arranged on the bottom of the concavity surface 23. The front side operation surface 2a and the back side operation surface 2b are opposed to each other to sandwich the bottom of the concavity surface 23.

Each operation surface connector 22 is connected to two strain generating body 3 so as to have a position relationship of sandwiching the operation surface connector 22 (the detail will be explained later). A coupling section 3e of each strain generating body 3 is coupled to a top end 22a of the operation surface connector 22 via a screw or an adhesive. Further, a fixed section 3c is engaged with a groove 94b of the casing 94 so that the fixed section 3c is fixed. A convexity 93b of the holding member 93 is engaged with a concavity 94c of the casing 94 so as to cover the strain generating body 3, and the convexity 93b is screwed with the concavity 94c (via screw holes 93a, 94d, respectively). Thus, the strain generating body 3 (i.e., the fixed section 3c) is surely fixed.

Figure 5:
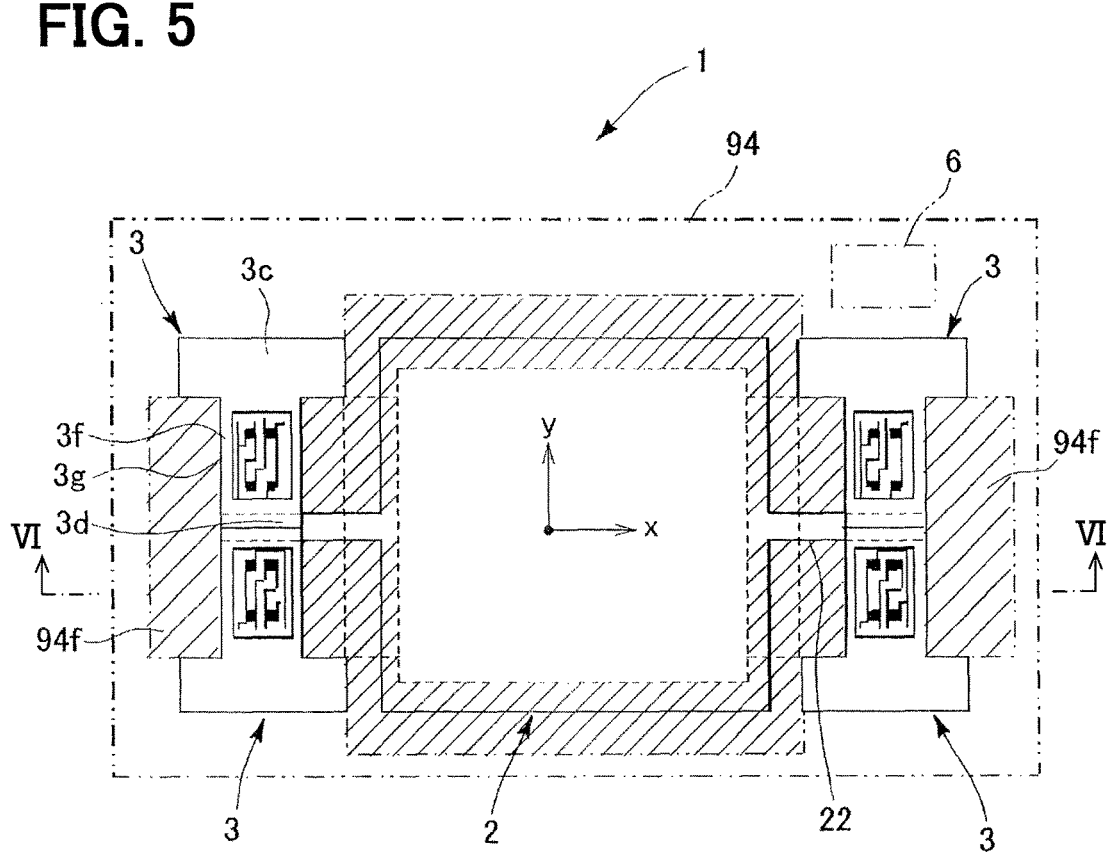
FIG. 5 is a top view of an operation body and a strain generating body of the operation position detection apparatus according to the first embodiment seeing from a front side.

Further, as shown in FIG. 5, one operation surface connector 22 is connected to two strain generating bodies 3 to have a position relationship of sandwiching the operation surface connector 22. Each operation surface connector 22 is formed on a X axis of X-Y coordinate system having a center of the front side operation surface 2a with the rectangular shape as an original point.

Each strain generating body 3 includes an extending section 3g, which extends from a connection position (i.e., the connection section 3d) corresponding to the operation surface connector 22 to be in parallel to the front side operation surface 2a. A top end of the extending section 3g as the fixed section 3c is fixed to the casing 94. Then, a surface of the extending section 3g provides a displacement transmission surface 3f, which is an elastic deformable body elastically deformable so that bending deformation is generated at the surface 3f when the operation force is applied to the front side operation surface 2a and the back side operation surface 2b.

Accordingly, when the operation force Fz (shown in FIGS. 7 to 9) is caused by the pushing force to the front side operation surface 2a, an operation displacement in a vertical direction Z with respect to the front side operation surface 2a is generated at the operation body 2. Then, a displacement in the vertical direction Z reflecting the operation displacement generated on a side, at which the displacement transmission surface 3f is disposed, is generated on the displacement transmission surface 3f of each strain generating body 3.

Further, when the operation force F (in FIGS. 16A and 16B) caused by the pushing force to the back side operation surface 3b is generated, similarly, a displacement in the vertical direction Z reflecting the operation displacement generated on a side, at which the displacement transmission surface 3f is disposed, is generated on the displacement transmission surface 3f of each strain generating body 3, the operation displacement being included in the operation displacement in the vertical direction Z generated at the operation body 2.

The distortion detection section 4 arranged on the displacement transmission surface 3f detects the displacement in the vertical direction Z (i.e., an elastic deformation amount) as the distortion.

Figure 6:
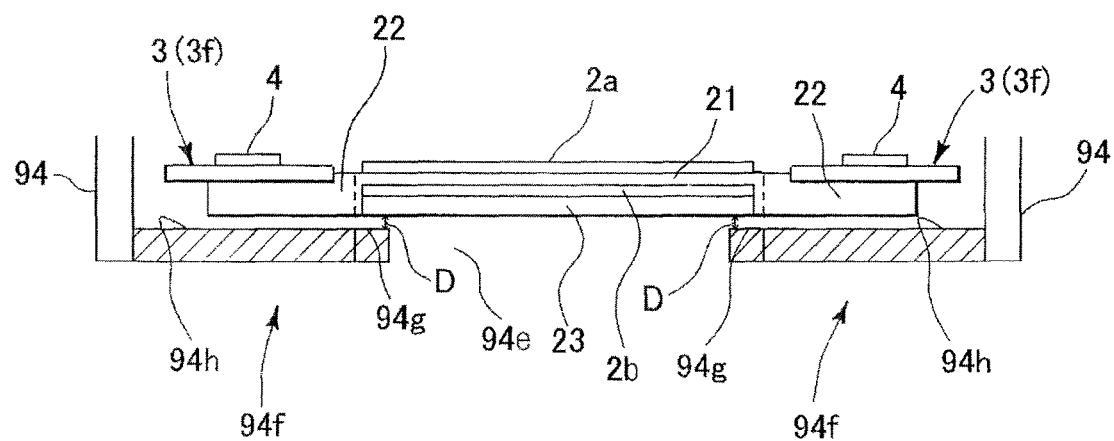
FIG. 6 is a cross sectional view of the operation body and the strain generating body of the operation position detection apparatus according to the first embodiment taken along line VI-VI in FIG. 5.

Further, as shown in FIG. 6, the front side operation surface 2a and each of the displacement transmission surface 3f are disposed on substantially the same plane.

Here, the dimensions of the opening 94e of the casing 94 may be reduced to be smaller than the operation main body 21 so that a clearance D is formed therebetween so as not to contact with the operation main body 21. In this case, a region 94g of the bottom 94f of the casing 94, which faces the back surface of the front side operation surface 2a of the operation body 2, provides the first deformation restriction surface. Another region 94h of the bottom 94f, which faces the back surface of the displacement transmission 3f of the strain generating body 3, provides the second deformation restriction surface. Thus, the operation body 2 does not contact with and is connected to the casing 94. The strain generating body 3 other than the fixed section 3c does not contact with the casing 94.

Since the first deformation restriction surface is formed, the deformation of the operation body 2 is restricted even when the pushing force is applied to the front side operation surface 2a with the excess force. Further, the operation position is accurately detected. Further, since the second deformation restriction surface is formed, the deformation of the displacement transmission surface 3f is restricted even when the excess operation force is applied to the operation body 2 and the strain generating body 3 with the pushing force to the front side operation surface 2a.

Further, the casing 94 accommodates a signal processing section 6. The signal processing section 6 is provided by a computer hardware including a signal processing circuit and the like such as a conventional CPU, a conventional ROM, a conventional RAM, and a conventional ND converter circuit. When the CPU executes a control program stored in the ROM, a function of the operation position detection apparatus 1 is realized. Specifically, the signal processing section 6 calculates the magnitude of the operation force generated by the pushing force and a position (i.e., an operation position) at which the pushing force is applied according to the elastic deformation amount detected by the distortion detection section 4.

Figure 7:
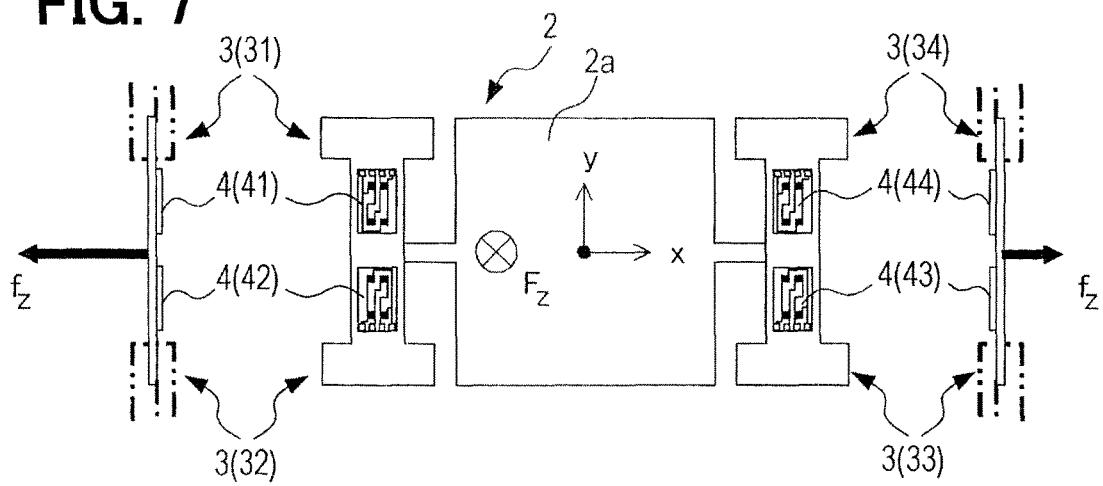
FIG. 7 is a diagram explaining a force applied to the strain generating body and caused by a pushing operation force applied to a front side operation surface.
Figure 8:
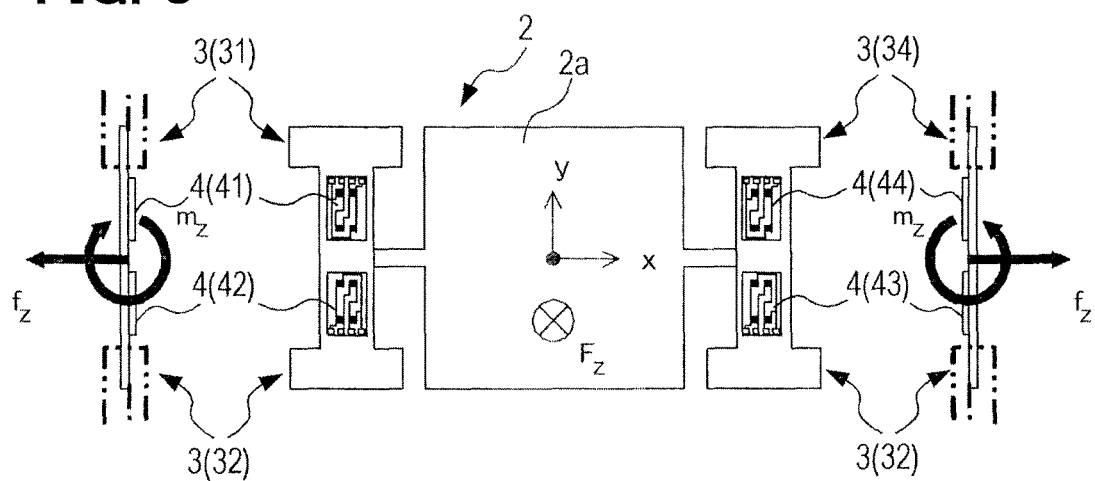
FIG. 8 is a diagram explaining a force applied to the strain generating body and caused by a pushing operation force applied to a front side operation surface.
Figure 9:
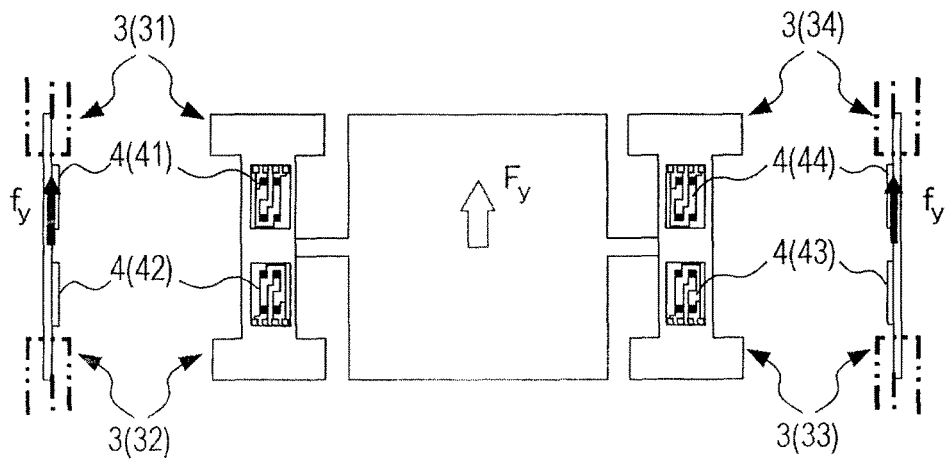
FIG. 9 is a diagram explaining a force applied to the strain generating body and caused by a pushing operation force applied to a front side operation surface.

Specifically, when the pushing operation force Fz is applied to the front side operation surface 2a, a component force fx of the pushing operation force Fz and a momentum force mz are applied to each strain generating body 3, which is fixed to the casing 94 (please refer to FIGS. 7 to 9). Further, when the pushing operation force F is applied to the back side operation surface 2b, a component force fz of the pushing operation force Fz as a vertical direction component of the pushing operation force F (please refer to FIGS. 16A and 16B).

At that time, since the strain generating body 3 is fixed to the casing 94, a bending deformation is forced to the strain generating body 3, so that a stretching stress or a compression stress on an in-plane direction is applied to the displacement transmission surface 3f as a principal surface of the strain generating body 3. In the first embodiment, the distortion detection section 4 having multiple distortion detection elements 4a-4d is formed on the displacement transmission surface 3f. The distortion detection element 4a-4d detects a stretching amount or a shrinking amount on the displacement transmission surface 3f corresponding to the stretching stress or the compressing stress.

Next, a force applied to the strain generating body 3 caused by the operation force generated on the pushed front side operation surface 2a will be explained. As shown in FIG. 7, when the operation force Fz is applied to the front side operation surface 2a along the Z axis direction perpendicular to the surface 2a on the X axis of the X-Y coordinate system having the center of the front side operation surface 2a with the rectangular shape as an original point, only the force fz is generated at the strain generating body 3 (i.e., bodies 31-34). Further, as shown in FIG. 8, when the operation force Fz along the Z axis direction on the Y axis is applied, the force fz and the momentum force mz are generated at the strain generating body 3 (i.e., bodies 31-34).

Figure 10:
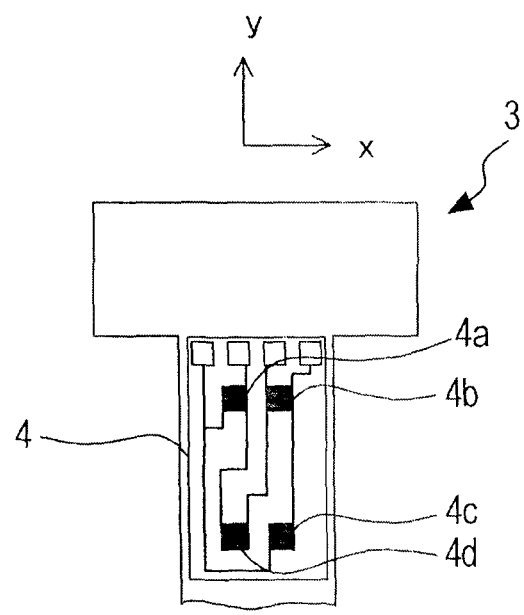
FIG. 10 is a diagram explaining a construction of a strain detection section.
Figure 11:
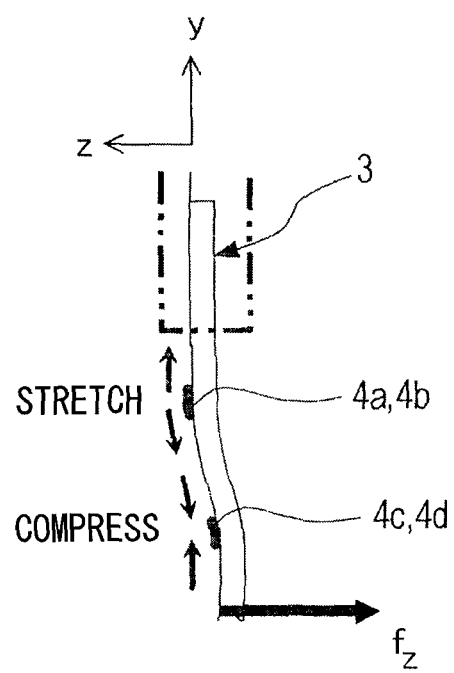
FIG. 11 is a diagram explaining a stress applied to a displacement transmission surface of the strain generating body when the pushing operation force is applied to the front side operation surface in perpendicular to the front side operation surface.

On the other hand, the distortion detection elements 4a-4d of each distortion detection section 4 (i.e., bodies 31-34) are arranged such that two distortion detection elements 4a-4d are aligned along the connection section 3d or the fixed section 3c (please refer to FIG. 10). Accordingly, the stress applied to the displacement transmission surface 3f of the strain generating body 3 provides the stretching stress at a position of the distortion detection element 4a, 4b, which is arranged along the fixed section 3c. The stress provides the compressing stress at a position of the distortion detection element 4c, 4d, which is arranged along the connection section 3d (please refer to FIG. 11).

Thus, in the distortion detection element 4a, 4b, at which the stretching stress is generated, the resistance is reduced. In the distortion detection element 4c, 4d, at which the compressing stress is generated, is increased (please refer to FIG. 12). In addition, an equivalent circuit of the distortion detection elements 4a-4d is indicated by a bridge circuit (please refer to FIG. 13). Thus, the signal processing section 6 detects a change of the bridge voltage Vout of the bridge circuit, so that the pushing force to the front side operation surface 2a. Further, the section 6 calculates the force fz and the momentum force mz applied to the strain generating body 3.

On the other hand, when the force Fy is applied to the front side operation surface 2a in an in-plane direction, the stress applied to the distortion detection elements 4a-4d of the distortion detection section 4 is the compressing stress at all of four elements 4a-4d or the stretching stress at all of four elements 4a-4d (please refer to FIG. 14). Accordingly, the bridge voltage Vout of the bridge circuit provided by the distortion detection elements 4a-4d is not changed. Thus, the force in the in-plane direction is not sensitive. Thus, it is not necessary to consider the force in the in-plane direction when the force fz and the momentum force mz applied to the strain generating body 3 are calculated.

When the pushing force is applied to the front side operation surface 2a, the signal processing section 6 calculates the operation position (i.e., x1 and y1) as follows (please refer to FIGS. 15A to 15C).

Specifically, when the signal processing section 6 detects the pushing force to the front side operation surface 2a according to the bridge voltage Vout of the bridge circuit formed on each distortion detection section 4, the signal processing section 6 calculates the force fz (i.e., fz1 and fz2) applied to the strain generating body 3 and the momentum force mz (i.e., mz1 and mz2) based on the bridge voltage Vout. Then, the section 6 calculates the center position (i.e., the operation position of (x1, y1)) of the operation force Fz applied to the front side operation surface 2a according to the calculated values of fz and mz and equations of (1-4) and (1-5).

The equations of (1-4) and (1-5) are developed from a force balance equation of (1-1), a momentum balance equation of (1-2) around the Y axis, and a momentum balance equation of (1-3) around the X axis. Here, w represents a distance between a center line of the strain generating body 31, 32 in parallel to the Y axis and a center line of the strain generating body 33, 34.

Figures 16A, 16B:
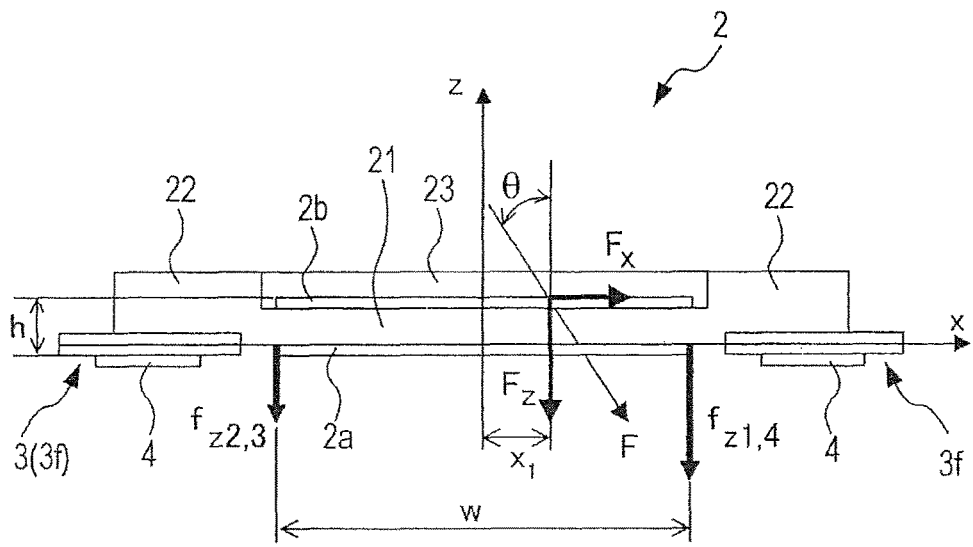
FIGS. 16A and 16B are diagrams explaining a calculation method of a center position of the operation force applied to the back side operation surface.

On the other hand, when the pushing force is applied to the back side operation surface 2b, and the direction of the operation force F caused by the pushing force tilts from the vertical direction of the back side operation surface 2b by an angle of θ, an error may be generated since the back side operation surface 2b is not disposed on the substantially same plane as the strain generating body 3 (please refer to FIGS. 16A and 16B).

Specifically, the signal processing section 6 detects the pushing force with respect to the back side operation surface 2b according to the change of the bridge voltage Vout of the bridge circuit, which is formed on each distortion detection section 4. Further, the section 6 calculates the forces fz1 to fz4, which are applied to the back side operation surface 2b in the Z axis direction perpendicular to the back side operation surface 2b, with respect to each strain generating body 3. According to a conventional gravity center calculation method indicated by equations of (2-1) to (2-3), the section 6 calculates the X coordinate (i.e., x1) of the center position (i.e., the operation position) of the operation force F, which is applied to the back side operation surface 2b. Here, the term of "w" represents a length of the back side operation surface 2b in the X axis direction. The term of "h" represents a distance between the back side operation surface 2b and the displacement transmission surface 3f. The Y coordinate of the operation position is also calculated similarly.

When the above calculation method is utilized, the left part of the equation of (2-3) provides a calculation result of the X coordinate of the operation position. This calculation result includes an error (indicative of tan θ·h), which is derived from the tilt angle of θ of the operation force F. The larger the distance h is, the larger the error is.

Thus, the operation position detection apparatus 1 according to the first embodiment having the above features receives the operation on each of the front side operation surface 2a and the back side operation surface 2b, which are arranged on both sides of the operation body 2, respectively, so that the apparatus 1 detects the magnitude of the operation force and the operation position. Accordingly, the apparatus 1 can receive various types of operations.

Further, the front side operation surface 2a is arranged on the substantially same plane as the displacement transmission surface 3f, on which the distortion detection section 4. Accordingly, when the pushing force is applied to the front side operation surface 2a, the distortion detection section 4 does not have sensitivity in a direction other than the vertical direction of the front side operation surface 2a. Thus, the section 4 detects only the force in the direction perpendicular to the front side operation surface 2a. Thus, when the pushing force is applied to the front side operation surface 2a, and the pushing force is applied to the front side operation surface 2a in a direction other than the vertical direction (i.e., the operation force tilts from the vertical direction of the front side operation surface 2a), the apparatus 1 can detect the operation position accurately.

Further, the signal processing section 6 calculates a moment generated around the X axis direction and a moment generated around the Y axis direction on the X-Y plane, and the force in the Z axis direction, which is perpendicular to the X-Y plane, according to the distortion generated at the distortion detection elements 4a-4d by the pushing force to the front side operation surface 2a wherein the front side operation surface 2a provides the X-Y plane as a two-dimensional orthogonal coordinate system. Further, the section 6 calculates the gravity center position based on the force and the moments as the operation position of the front side operation surface 2a.

The signal processing section 6 calculates the force in the z axis direction perpendicular to the X-Y plane according to the distortion generated at the distortion detection elements 4a-4d by the pushing force to the back side operation surface 2b wherein the back side operation surface 2b provides the X-Y plane as a two-dimensional orthogonal coordinate system. Further, the section 6 calculates the gravity center position based on the force as the operation position of the back side operation surface 2a.

Accordingly, with respect to the pushing force to the front side operation surface 2a, the operation position is calculated by applying a conventional calculation method for calculating the operation position in the operation position detection apparatus 1, in which the operation surface and the displacement transmission surface are not arranged on the same plane. Thus, it is not necessary to develop a new calculation method. Further, with respect to the pushing force to the back side operation surface 2b, a conventional calculation method of the operation position in the operation position detection apparatus is utilized. Accordingly, the operation position detection apparatus 1 is manufactured and designed with a low cost and a short period.

The concavity surface 23 is formed on the back side of the operation main body 21. The back side operation surface 2b is arranged on the back side of the concavity surface 23. The distance between the displacement transmission surface 3f and the back side operation surface 2b is minimized. Accordingly, the error in the calculation result of the operation position on the back side operation surface 2b is minimized.

The displacement transmission surface 3f of the strain generating body 3 is an elastic deformable body, which provides a bending deformation. The distortion detection section 4 detects the elastic deformation amount generated in an in-plane direction of the displacement transmission surface 3f. Thus, only the force perpendicular to the back side operation surface 2b or the front side operation surface 2a is detected.

Further, the distortion detection section 4 is provided by the distortion detection elements 4a-4d and the like, which are arranged on the displacement transmission surface 3f of each strain generating body 3. Accordingly, without using an element other than the distortion detection element, the apparatus 1 can detect the operation position with high accuracy. Thus, the dimensions of the operation position detection apparatus 1 are minimized, and the manufacturing cost of the apparatus 1 is reduced.

Further, the operation main body 21 of the operation body 2 includes multiple operation surface connectors 22, which protrude to the outside circumference. The operation surface connectors 22 provide a pair of connectors 22, which face each other and sandwich the operation main body 21 therebetween. Further, the connectors 22 has a top end, which is connected to the connection section 3d of the strain generating body 3. Accordingly, the operation displacement is transmitted to the strain generating body 3 and the distortion detection section 4 with high efficiency.

Further, the strain generating body 3 includes the extending section 3g, which extends from the connection section 3d. the top end of the extending section 3g forms the fixed section 3c. Further, the extending section 3g provides the displacement transmission surface 3f. The distortion detection section 4 is arranged on the displacement transmission surface 3f. Thus, the connection section 3d, the strain generating body 3 and the displacement transmission surface 3f are integrated into one body.

Further, the casing 94 is arranged to have a clearance with the operation body 2 and the strain generating body 3 so as not to contact with parts other than the fixed section 3c.

Accordingly, the operation body 2 and the strain generating body 3 are fixed to the casing 94 not to prevent the pushing force to the front side operation surface 2a or the back side operation surface 2b.

Further, one operation surface connector 22 is connected to two strain generating bodies 3, which sandwich the one operation surface connector 22. Accordingly, the operation position is calculated by a method similar to the conventional method. It is not necessary to develop a new calculation method. Thus, the operation position detection apparatus 1 is manufactured with a low cost and a short period.

Figure 17:
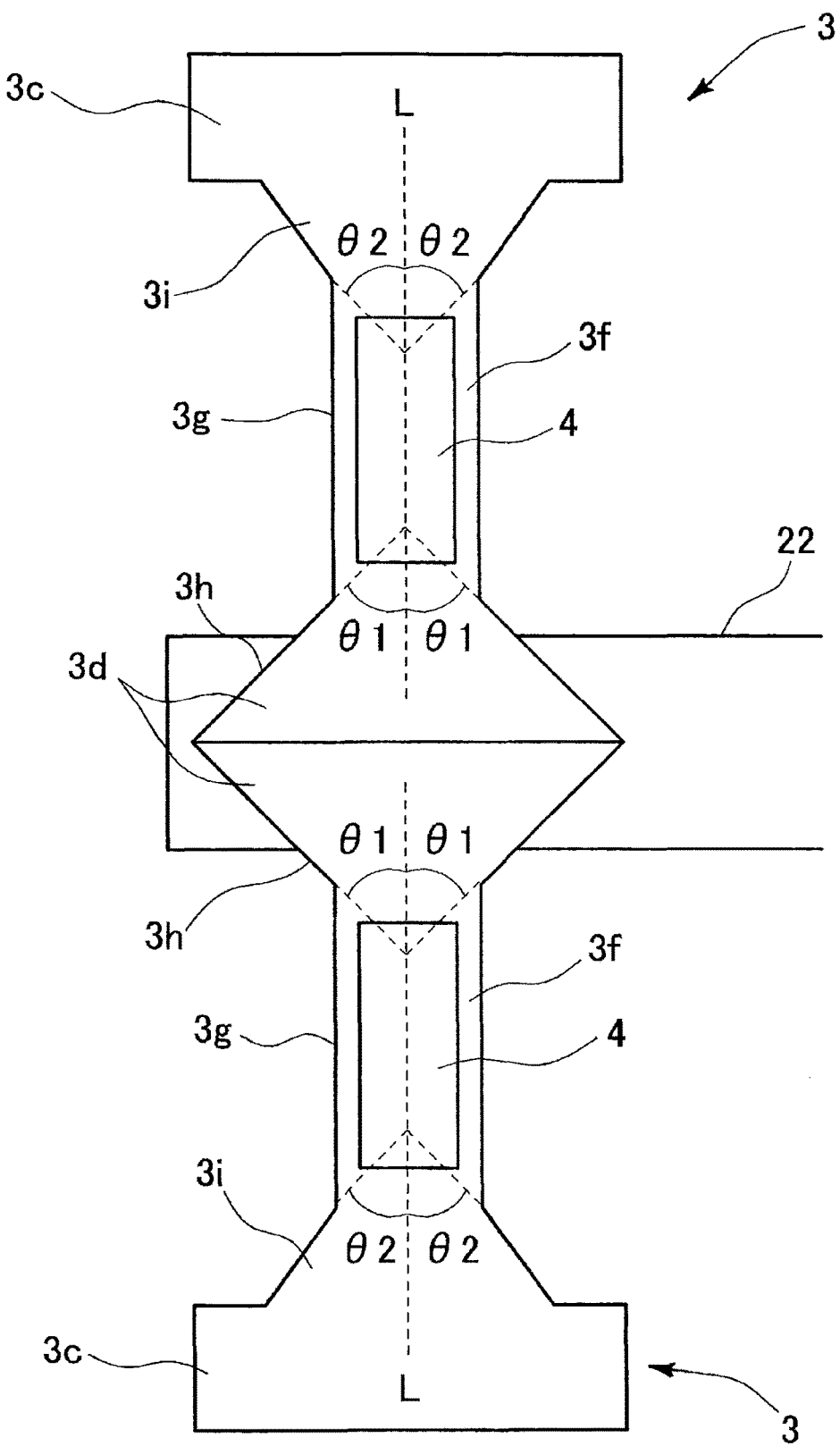
FIG. 17 is a top view showing the strain generating body according to a modification of the first embodiment.

Next, FIG. 17 shows a modification of the strain generating body 3 in the first embodiment. The strain generating body 3 according to the modification extends in the direction perpendicular to the extending direction of the operation surface connector 22 from the connection position with the operation surface connector 22. The body 3 includes a base end side taper section 3h having a width, which becomes narrower from the connection section 3d with the operation surface connector 22 toward an extending end (i.e., the fixed section 3c). Further, the strain generating body 3 includes a top end side taper section 3i having a width, which becomes narrower from the fixed section 3c with the casing 94 toward the connection section 3d with the operation surface connector 22, and the extending section 3g, on which the displacement transmission surface 3f is formed, the extending section 3g connecting the base end side taper section 3h and the top end side taper section 3i.

Further, the base end side taper section 3h has an angle θ1 on a fixed section 3c side of the operation surface connector 22 with respect to the axis line L in the extending direction of the extending section 3g, and the angle θ1 is preferably equal to or larger than 30 degrees and equal to or smaller than 60 degrees. Further, the top end side taper section 3i has an angle θ2 on a connection section 3d side of the casing 94 with respect to the axis line L in the extending direction of the extending section 3g, and the angle θ2 is preferably equal to or larger than 30 degrees and equal to or smaller than 60 degrees.

The above construction provides to secure the strength of the connection section 3d and the fixed section 3c sufficiently and to detect the distortion on the displacement transmission surface 3f with high accuracy.

Second Embodiment

Figure 18:
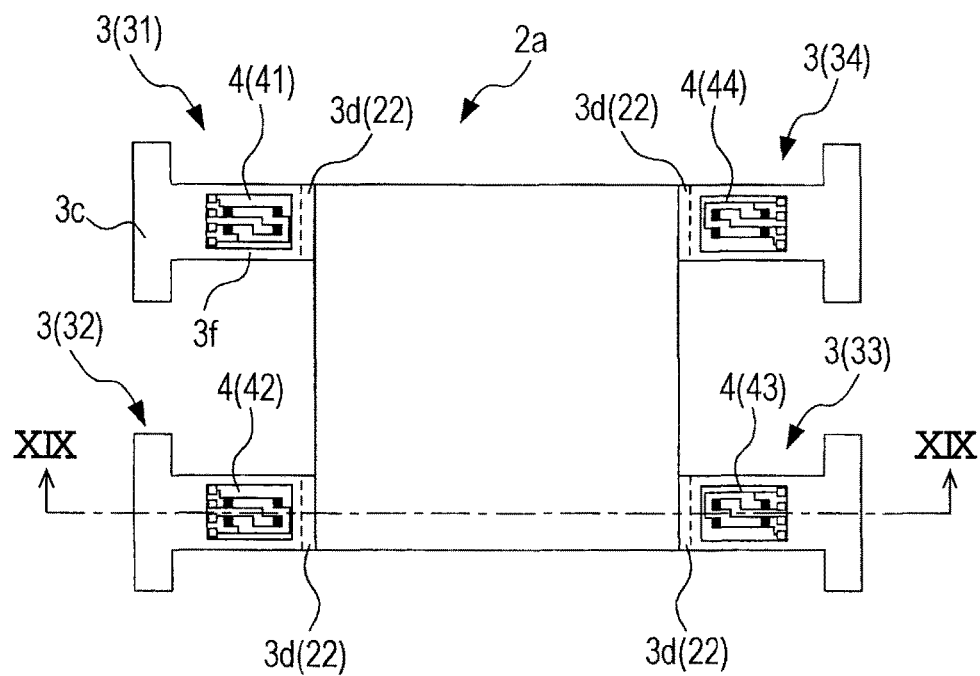
FIG. 18 is a top view showing the operation body, the strain generating body and the like in an operation position detection apparatus according to a second embodiment.
Figure 19:
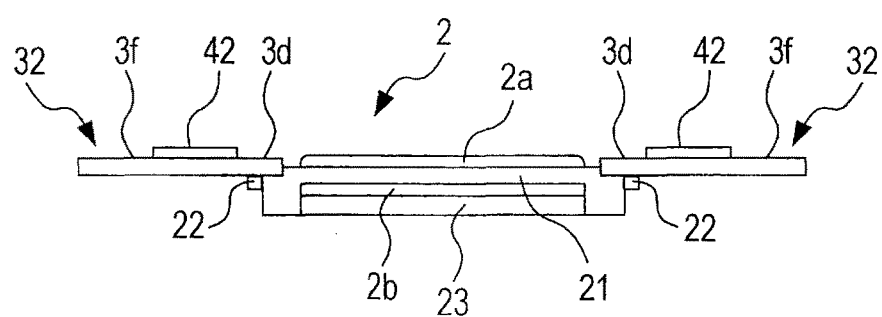
FIG. 19 is a cross sectional view of the operation body, the strain generating body and the like in the operation position detection apparatus taken along line XIX-XIX in FIG. 18 according to the second embodiment.
Figure 20:
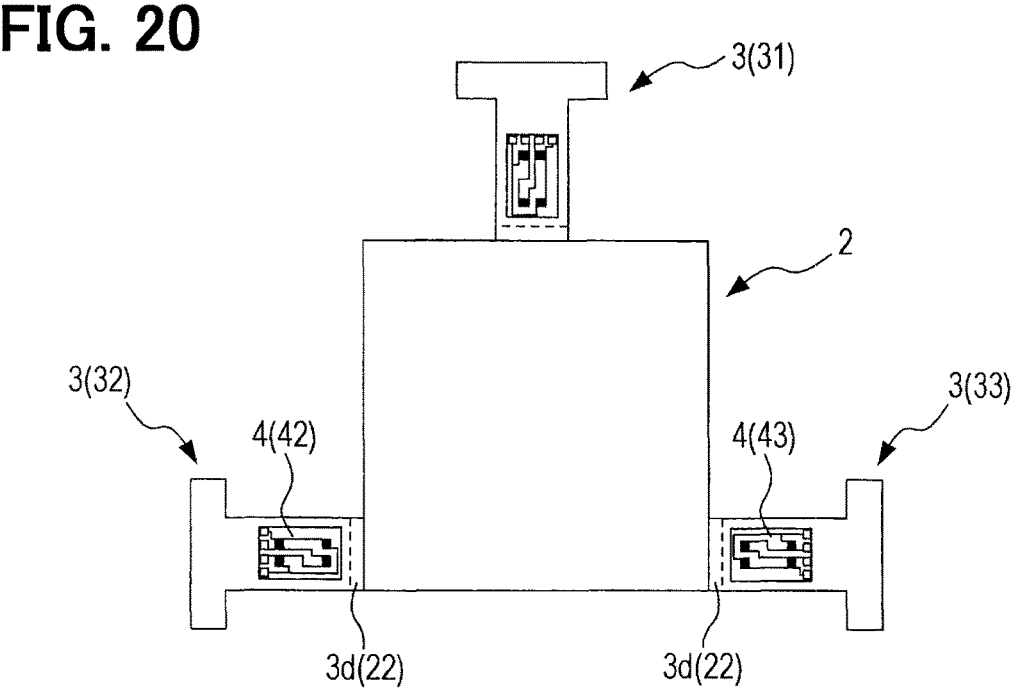
FIG. 20 is a top view showing the operation body, the strain generating body and the like in an operation position detection apparatus according to a third embodiment.

Next, the operation position detection apparatus 1 according to the second embodiment will be explained. As shown in FIGS. 18 and 19, in the second embodiment, the strain generating body 3 is attached to the operation surface connector 22, which protrudes from four corners of the operation body 2 having the rectangular shape. Specifically, one operation surface connector is connected to one strain generating body. The construction of the strain generating body 3 and the distortion detection section 4 are similar to the first embodiment.

In the first embodiment, a large stress is easily applied to the connection part between the operation body 2 and two strain generating bodies 3. However, in the second embodiment, the stress diverges into four parts. Thus, the reliability and the durability of the apparatus are improved. In the second embodiment, the front side operation surface 2a and all of the displacement transmission surfaces 3f are disposed on the same plane (which is similar to other latter embodiments).

Third Embodiment

Next, an operation position detection apparatus according to the third embodiment will be explained. As shown in FIG.

20, in the operation position detection apparatus according to the third embodiment, the number of strain generating bodies 3 (or the distortion detection sections 4) in the operation position detection apparatus according to the second embodiment is reduced from four to three, and the strain generating bodies 3 (or the distortion detection sections 4) are arranged at a peripheral section of the operation body 2. When the number of the distortion detection section 4 is at least three, the gravity center position can be calculated. In the third embodiment, since the number of distortion detection elements is reduced, the manufacturing cost of the apparatus is reduced.

Fourth Embodiment

Figure 21:
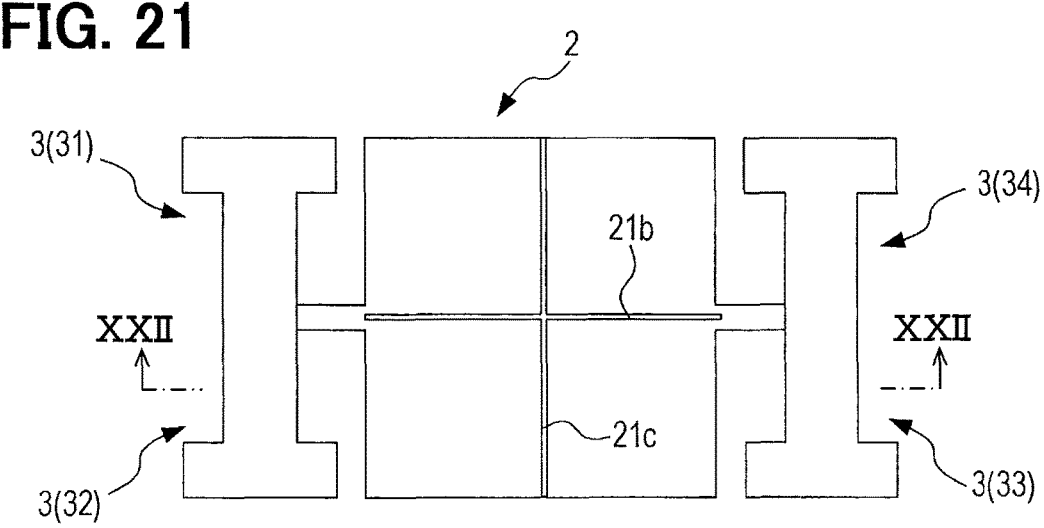
FIG. 21 is a top view showing the operation body, the strain generating body and the like in an operation position detection apparatus according to a fourth embodiment.
Figure 22:
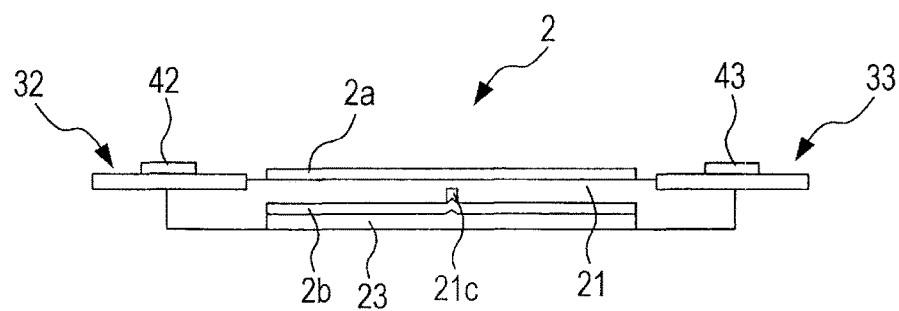
FIG. 22 is a cross sectional view of the operation body, the strain generating body and the like in the operation position detection apparatus taken along line XXII-XXII in FIG. 21 according to the fourth embodiment.

Next, an operation position detection apparatus according to the fourth embodiment will be explained. In the fourth embodiment, the grooves 21b, 21c are formed in a region, which is covered with the back side operation surface 2b and disposed on the back side of the operation main body 21 of the operation body 2 (please refer to FIGS. 21 and 22).

Here, the number of grooves and the direction of the grooves are not limited specifically. A protrusion having a rib shape instead of the groove may be formed. Alternatively, a concavity and/or a convexity may be formed. Further, a similar groove or the like may be formed in a region, which is covered with the font side operation surface 2a on the surface of the operation main body 21.

Figure 23:
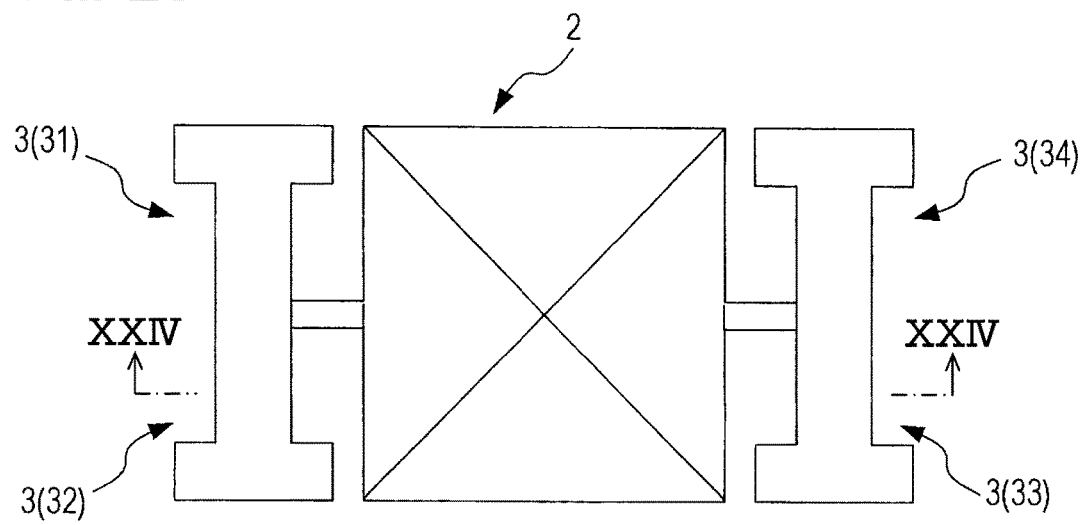
FIG. 23 is a top view showing the operation body, the strain generating body and the like in an operation position detection apparatus according to the fourth embodiment.
Figure 24:
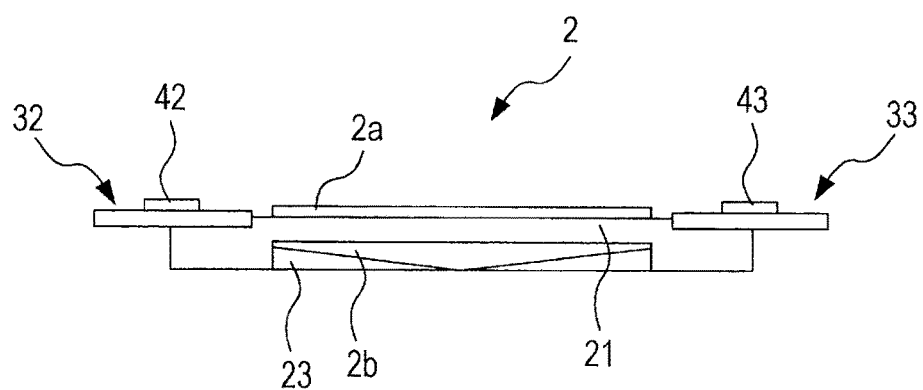
FIG. 24 is a cross sectional view of the operation body, the strain generating body and the like in the operation position detection apparatus taken along line XXIII-XXIII in FIG. 23 according to the fourth embodiment.

Further, the shape of the back side operation surface 2b may be formed to have a substantially regular tetrahedron shape with a center, which is the highest part (please refer to FIGS. 23 and 24). Here, it is necessary to adjust the height of the center section of the back side operation surface 2b not to deteriorate the detection accuracy of the operation position. Further, it goes without saying that the front side operation surface 2a may be also formed similarly.

Thus, when the back side operation surface 2b (or the front side operation surface 2a) is pushed, it is possible to determine the operation position according to the tactile sense. Thus, usability is improved.

Here, in addition to the substantially regular tetrahedron shape, the back side operation surface 2b may be formed to have a conical shape, an earthenware mortar shape or the like in order to determine a specific position on the back side operation surface 2b according to the tactile sense. Alternatively, a groove, a rib shaped protrusion, a concavity, a convexity or the like may be formed on the back side operation surface 2b.

Fifth Embodiment

Figure 25:
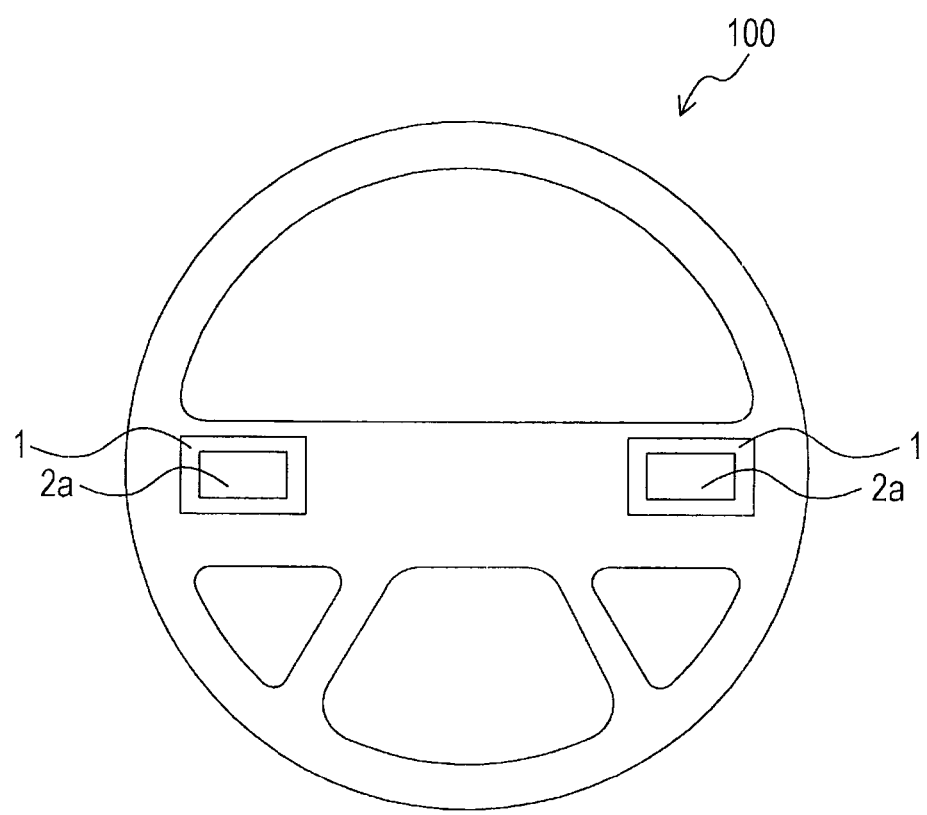
FIG. 25 is a front view showing a steering wheel according to a fifth embodiment.

Next, a fifth embodiment will be explained. In the fifth embodiment, two operation position detection apparatuses 1 described in any one of the first to fourth embodiments are attached to a steering device 100 of a vehicle such that the front side operation surface 2a faces a driver, who is driving the vehicle (please refer to FIG. 25).

These operation position detection apparatuses 1 are attached to an upper side spoke so as to be adjacent to a steering wheel. When the driver grips the steering wheel, it is possible to execute an operation to the front side operation surface 2a with a thumb and to execute an operation to the back side operation surface 2b with other fingers.

The attachment position of the operation position detection apparatus 1 is not limited to the above. The operation position detection apparatus 1 may be attached to a certain position adjacent to the steering wheel or attached on the steering wheel. Further, one, three or more operation position detection apparatuses 1 may be attached to the steering device 100.

Figure 26:
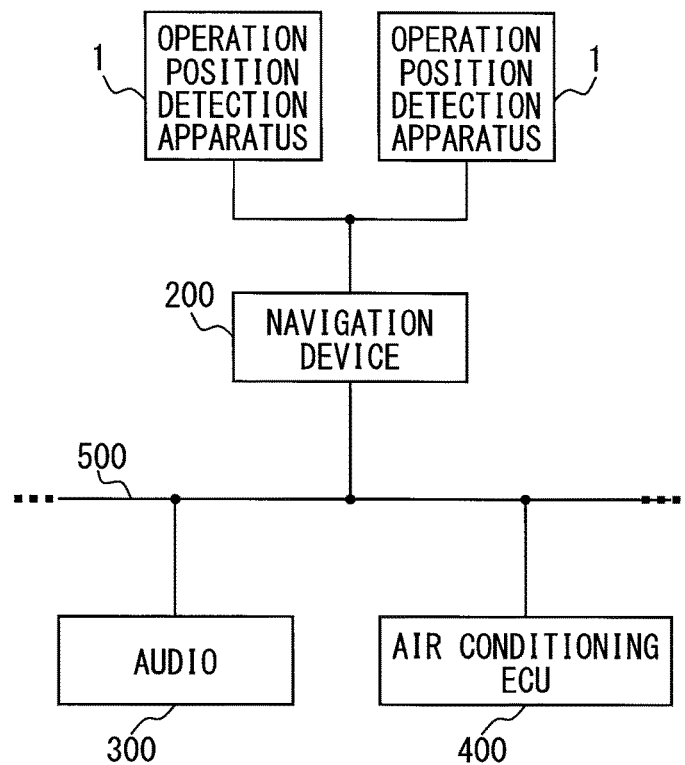
FIG. 26 is a block diagram showing a vehicular system including a navigation device and the like, which is connected to the operation position apparatus according to the fifth embodiment.

These operation position detection apparatus 1 is connected to the navigation device 200. Further, the navigation device 200 is connected to an ECU such as an audio system 300 and an air conditioning ECU 400 via an in-vehicle LAN 500 (please refer to FIG. 26).

Figure 27:
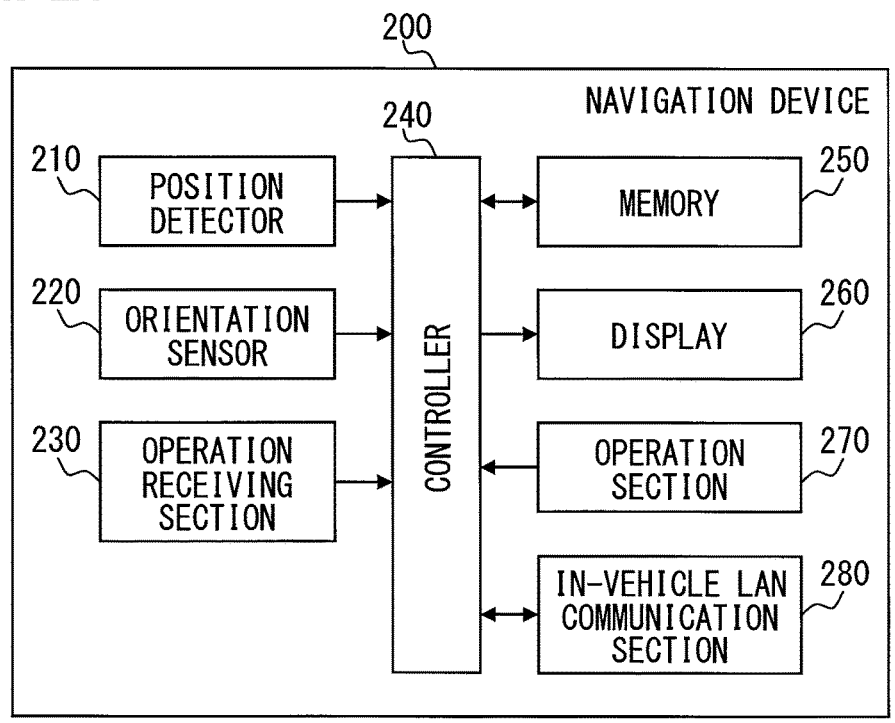
FIG. 27 is a block diagram showing the navigation device according to the fifth embodiment.

As shown in FIG. 27, the navigation device 200 includes a position detector 210 for detecting a current position of the vehicle, an orientation sensor 220 for detecting an absolute orientation based on geomagnetism, and an operation receiving section 230 for communicating with the signal processing section 6 of the operation position detection apparatus 1. Further, the device 200 is provided by a conventional micro computer mainly, which includes a CPU, a ROM, a RAM, a I/O, and a bus line for connecting them. The device 200 further includes a control section 240 for totally controlling the navigation device 200 according to a program or the like, which is up-loaded to the RAM.

Further, the navigation device 200 further includes a HDD and/or a flash memory, and further, includes a memory 250 for storing a map data and the like, and a liquid crystal display, and furthermore, includes a display 260 for displaying various information. Here, the display 260 may be arranged to be integrated with a meter display or the like in a dash board. Alternatively, the display 260 may be a head up display.

The navigation device 200 further includes a key switch, a touch switch and the like. The device 200 furthermore includes an operation section 270 for receiving various operations, and an in-vehicle LAN communication section 280 for communicating with other ECU via the in-vehicle LAN 500.

The signal processing section 6 of each operation position detection apparatus 1 transmits operation information, which indicates a pushed operation surface, a detected operation position, and an operation force, to the navigation device 200 when the front side operation surface 2a and the back side operation surface 2b are pushed.

On the other hand, the control section 240 of the navigation device 200 executes various processes according to the operation information received from the signal processing section 6. Further, the control section 240 transmits the operation information received from the operation position detection apparatus 1 to other ECU via the in-vehicle LAN 500 if necessary. Thus, it is possible to operate other ECU with using the operation position detection apparatus 1.

Further, the receiving operations may be assigned to the front side operation surface 2a, which is operable by the thumb with gripping the steering wheel, and the back side operation surface 2b, which is operable by other fingers.

Specifically, the driver who is driving the vehicle may not visually confirm the back side operation surface 2b. Further, under a condition that the driver grips the steering wheel, it may be difficult for the driver to move other fingers other than the thumb handily. Accordingly, it is considered that the back side operation surface 2b may receive an executable operation with repeating a simple finger movement such as tapping an operation surface with a finger and sliding a finger, which contacts the operation surface.

A concrete example of the above operations may be an operation for changing a set value continuously such as a volume of the audio system 300, a set temperature and an air blow amount of the air conditioning ECU 400, and an opening degree of a window of the vehicle. Further, in addition to the above operation, it is considered that the example may be an operation for changing continuously a scale and an angle of a map image and an operation for scrolling the map image.

On the other hand, regarding the front side operation surface 2a, the driver easily visually confirms the front side operation surface 2a while the driver is driving the vehicle. Further, under a condition that the driver grips the steering wheel, it may be easy for the driver to move the thumb comparatively handily. Accordingly, it is considered that any operation may be assigned to the front side operation surface 2a (and further, the above-described operation for changing a set value continuously may be assigned to the front side operation surface 2a).

Thus, the driver can operate the navigation device 200 and the like under a condition that the driver grips the steering wheel. Thus, convenience is improved. Further, since each operation position detection apparatus 1 includes two operation surfaces of the front side operation surface 2a and the back side operation surface 2b, an user can execute various operations.

Further, the executable operation with repeating a comparatively simple finger movement for changing the set value continuously is assigned to the back side operation surface 2b. Accordingly, under a condition that the driver grips the steering wheel, the driver can easily execute the operation with respect to the back side operation surface 2b. Thus, the operation does not bother the driver who is driving the vehicle.

As described above, the back side operation surface 2b has the detection accuracy of the operation position or the like, which is lower than the front side operation surface 2a. However, the above operations do not require the high detection accuracy of the operation position, and therefore, it is considered that a risk for generating the erroneous operation via the operation of the back side operation surface 2b is low.

It is difficult for the driver who is driving the vehicle to visually confirm the back side operation surface 2b in general. Thus, the operation position detection apparatus 1 may be provided by the operation position detection apparatus 1 according to the fourth embodiment, and a pushing position on the back side operation surface 2b may be determined by the tactile sense. Thus, even when the driver is driving the vehicle, the driver can execute the operation to the back side operation surface 1b with high accuracy.

Other Embodiments (1) In the operation position detection apparatus 1 according to the first to fifth embodiments, the front side operation surface 2a and the displacement transmission surface 3f are arranged on the same plane. However, it is not limited to this feature. For example, the displacement transmission surface 3f may be arranged between the front side operation surface 2a and the back side operation surface 2b.

Further, in the operation position detection apparatus 1 according to the first to fifth embodiments, the back side operation surface 2b is arranged on the bottom of the concavity 23, which is formed on the back side of the operation body 2. Alternatively, the back side operation surface 2b may be arranged on the back side of the operation body 2 without forming the concavity 23.

In the above case, the operation position detection apparatus 1 can receive the operation from each of the front side operation surface 2a and the backs ide operation surface 2b, and therefore, the variations of operations are increased.

(2) Further, in the fifth embodiment, the operation position detection apparatus 1 according to the first to fourth embodiments is connected to the navigation device 200. Alternatively, the apparatus 1 may be connected to other ECU. Further, the operation position detection apparatus 1 may be applied to any type of electric equipment in addition to the vehicular device such as the navigation device 200. In these cases, a similar effect is obtained.

The signal processing section 6 in the operation position detection apparatus 1 corresponds to an operation position calculation section.

Further, the navigation device 200 according to the fifth embodiment corresponds to the vehicular device, and the control section 240 of the navigation device 200 corresponds to a control device.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. An operation position detection apparatus comprising:
an operation body including a front side operation surface and a back side operation surface and having a substantially plate shape;
a casing accommodating the operation body;
at least three or more strain generating bodies arranged on at least one of the front side operation surface and the back side operation surface, wherein each strain generating body includes a connection section for connecting to the operation body, a fixed section fixed to the casing, and a displacement transmission surface displaceable according to an operation force, which is generated by a pushing pressure to each of the front side operation surface and the back side operation surface, and wherein the connection section is arranged on one end of the strain generating body, the fixed section is arranged on the other end of the strain generating body, and the displacement transmission surface is arranged between the connection section and the fixed section;
a distortion detection section arranged on the displacement transmission surface of each strain generating body and detecting a distortion of the displacement transmission surface caused by a displacement of the strain generating body; and
an operation position calculation section detecting which of the front side operation surface and the back side operation surface is pushed, the magnitude of the operation force generated by the pushing pressure, and an operation position as a position at which the pushing pressure is applied, according to the distortion detected by each distortion detection section.

2. The operation position detection apparatus according to claim 1,
wherein the connection section of each strain generating body is connected to a periphery of the operation body, and
wherein the front side operation surface and the displacement transmission surface of all of the strain generating bodies corresponding to the front side operation surface are arranged on a same plane.

3. The operation position detection apparatus according to claim 2,
wherein the front side operation surface is defined as a X-Y plane of a two-dimensional orthogonal coordinate system,
wherein a predetermined direction of the X-Y plane is defined as a first direction, and a direction perpendicular to the first direction is defined as a second direction,
wherein a direction perpendicular to the X-Y plane is defined as a third direction,
wherein the operation position calculation section calculates a moment around the first direction, a moment around the second direction and a force in the third direction according to the distortion detected by the distortion detection section and caused by the pushing pressure to the front side operation surface,
wherein the operation position calculation section calculates a gravity center position based on the moment around the first direction, the moment around the second direction and the force in the third direction,
wherein the operation position calculation section detects a calculated gravity center position as the operation position of the front side operation surface,
wherein the back side operation surface is defined as a X-Y plane of another two-dimensional orthogonal coordinate system,
wherein a predetermined direction of the another X-Y plane is defined as a fourth direction, and a direction perpendicular to the fourth direction is defined as a fifth direction,
wherein a direction perpendicular to the another X-Y plane is defined as a sixth direction,
wherein the operation position calculation section calculates a force in the sixth direction according to the distortion detected by the distortion detection section and caused by the pushing pressure to the back side operation surface,
wherein the operation position calculation section calculates another gravity center position based on the force in the sixth direction,
wherein the operation position calculation section detects another calculated gravity center position as the operation position of the back side operation surface.

4. The operation position detection apparatus according to claim 3,
wherein a back side of the operation body 2 further includes a concavity surface,
wherein the back side operation surface is arranged on a bottom of the concavity surface, and
wherein the front side operation surface is arranged at a position opposing to the back side operation surface to sandwiching the concavity surface therebetween.

5. A vehicular apparatus comprising:
the operation position detection apparatus according to claim 1 and attached to a steering device of a vehicle in such a manner that the front side operation surface faces a driver, who is driving the vehicle; and
a control device executing various processes based on the magnitude of the operation force or the operation position, which are calculated with respect to the pushing pressure to the front side operation surface or the back side operation surface.

6. The vehicular apparatus according to claim 5,
wherein the control device executes various processes based on the magnitude of the operation force or the operation position, which are calculated with respect to the pushing pressure to the front side operation surface in the operation position detection apparatus,
wherein the control device executes a process for changing continuously a predetermined set value based on the magnitude of the operation force or the operation position, which are calculated with respect to the pushing pressure to the back side operation surface in the operation position detection apparatus.

7. The vehicular apparatus according to claim 5,
wherein the back side operation surface includes a concavity or a convexity for determining a position on the back side operation surface.

* * * * *